July 15, 1969
J. W. CHAMBERS, SR
3,455,518
CUTTING ASSEMBLY AND ELEMENT FOR DISPOSERS Filed Aug. 4, 1965

INVENTOR.
JOSEPH W. CHAMBERS, SR.

BY *Fulwider, Patton, Rieber,
Lee & Utecht*

ATTORNEYS

July 15, 1969   J. W. CHAMBERS, SR   3,455,518
CUTTING ASSEMBLY AND ELEMENT FOR DISPOSERS
Filed Aug. 4, 1965   2 Sheets-Sheet 2
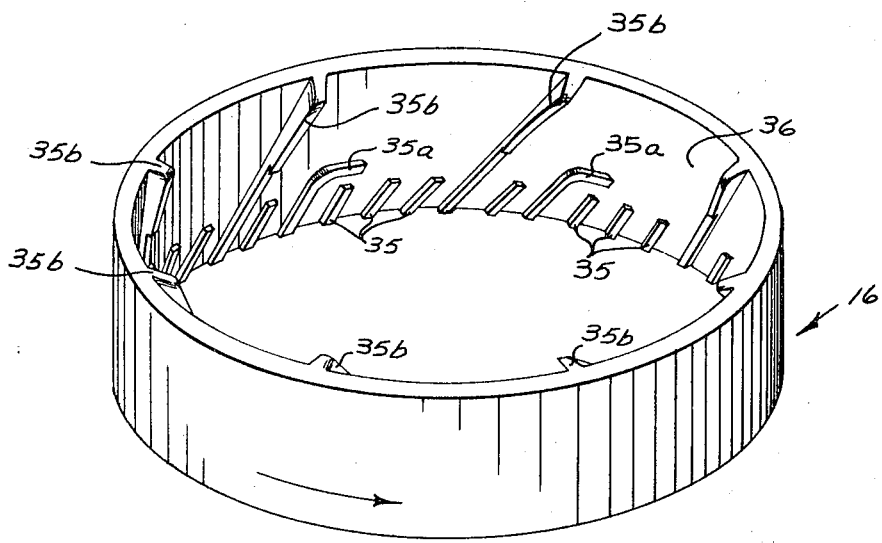
FIG 2
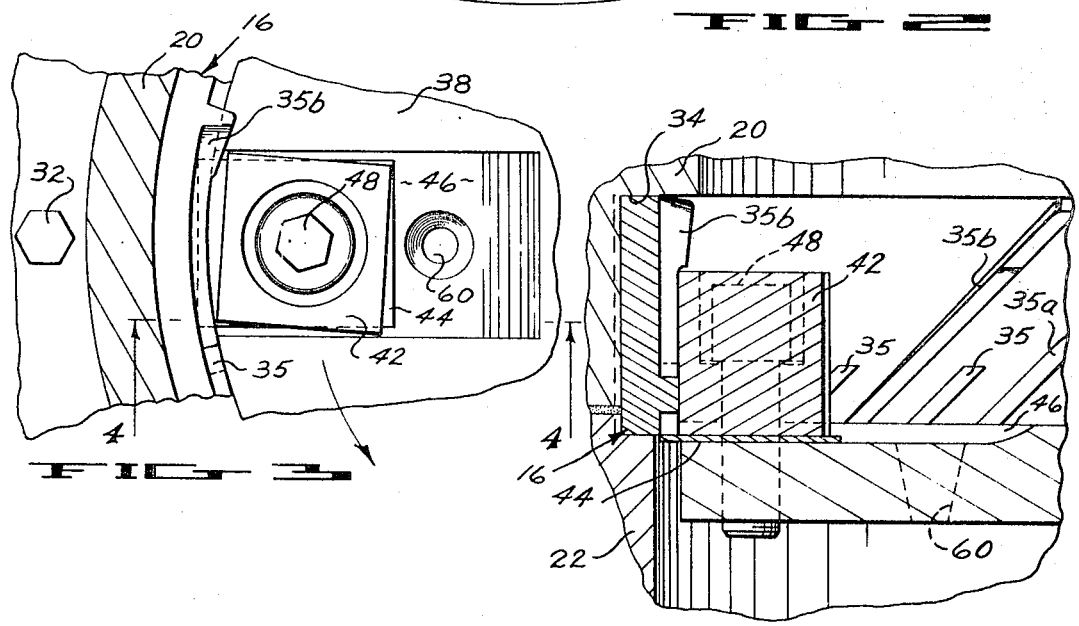
FIG 3
FIG 4
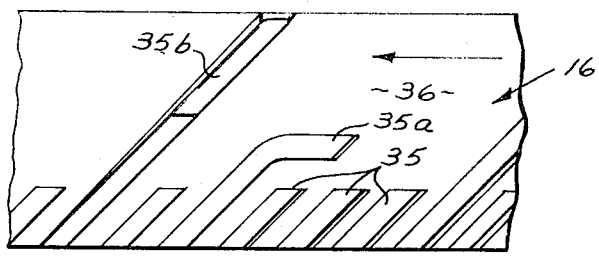
FIG 5
*INVENTOR.*
JOSEPH W. CHAMBERS, SR.
BY Fulwider, Patton, Rieber, Lee & Utecht
ATTORNEYS United States Patent Office 3,455,518
Patented July 15, 1969

3,455,518
CUTTING ASSEMBLY AND ELEMENT
FOR DISPOSERS
Joseph W. Chambers, Sr., Compton, Calif., assignor to
Atomic Disposer Corp., Compton, Calif., a corporation
of California
Filed Aug. 4, 1965, Ser. No. 477,192
Int. Cl. B02c 7/08
U.S. Cl. 241—257                                        5 Claims

ABSTRACT OF THE DISCLOSURE

A disposer including a metal body having a vertical hole defining an inner wall carrying a circular array of inwardly projecting spaced teeth each defining a plurality of shearing edges. A disc is supported centrally in the vertical hole and rigidly carries a cutter means for consecutively cooperating with said plurality of shearing edges upon turning of the disc.

---

Figure 1:
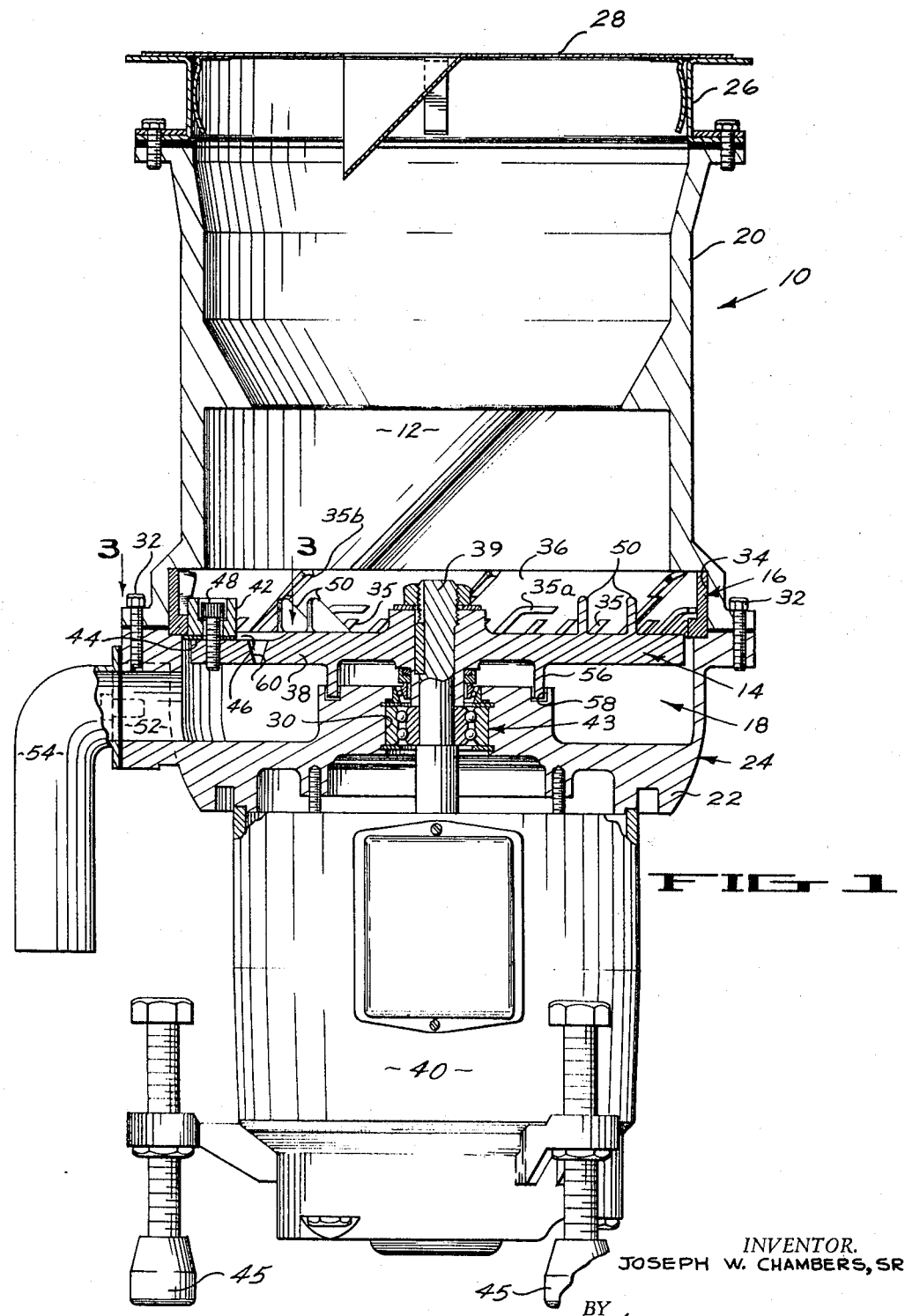

The present invention relates to improvements in disposers for reducing waste materials and, more particularly, to an improved cutting assembly and element for use in such disposers.

Disposers for reducing waste products in industrial plants, hospitals, restaurants, residences, and the like, commonly comprise a hollow housing including a top chamber for receiving waste material, a cutting assembly for reducing the waste material, and an outlet chamber connected to a sewage line. Each commercial disposer includes a slightly different cutter assembly. Some include a stationary ring carrying vertical teeth and a rotating block for chopping waste material between the teeth of the ring and the block. Others, incorporate swiveling cutters carried by a rotating disc to crush waste material against a surrounding side wall.

Although these and other forms of cutter assemblies are employed in commercially available disposers, they all suffer under substantially the same limitations. In particular, commercially available disposers have great difficulty in reducing and disposing of cloth, plastic and fibrous substances. Such waste materials just foam, with the water introduced to the disposer, over the top of the cutter assembly. It takes an appreciable length of time for any of such material to be reduced, if at all. Also, commercial disposers may be permanently damaged or stalled in operation by accidental dropping of bones or small metal objects, such as pins, needles, hairpins, syringes, and the like, into the cutter assemblies thereof.

Accordingly, it is an object of the present invention to provide an improved cutter assembly which overcomes the problems and limitations of commercially available disposers.

Another object of the present invention is to provide an improved cutter element for a disposer cutter assembly, which enables the disposer to rapidly reduce and dispose of cloth, plastic, bones, fibrous substances and the like.

A further object of the present invention is to provide an improved cutter ring for a disposer cutter assembly which enables the disposer to reduce small metal objects, such as pins, needles, hairpins, syringes and the like, without being damaged or stalled thereby.

Still another object of the present invention is to provide an improved cutter ring for a disposer cutter assembly which is extremely sturdy in construction and long lasting, durable and reliable in its operation.

The foregoing, as well as other objects and advantages of the present invention may be more clearly understood by reference to the following detailed description when considered with the drawings which, by way of example only, illustrate an improved cutter ring and disposer cutter assembly embodying the features of the present invention.

In the drawings:
FIGURE 1 is a partially sectioned side view of a disposer incorporating the improved cutting ring and cutter assembly;
FIGURE 2 is a perspective view of the improved cutter ring;
FIGURE 3 is a fragmentary sectional view taken along the line 3—3 of FIGURE 1;
FIGURE 4 is a fragmentary sectional view taken along the line 4—4 of FIGURE 3; and
FIGURE 5 is a fragmentary front view of a portion of the inside of the cutter ring of FIGURE 2.

In the drawings, the disposer is represented generally by the numeral 10 and includes an upper waste receiving chamber 12, a cutter assembly 14 including an improved cutter ring 16 for reducing waste supplied to the upper chamber, and a lower discharge chamber 18 for receiving the reduced waste material and directing same to a sewage line.

More particularly, the upper and lower chambers 12 and 18 are formed in upper and lower portions 20 and 22, respectively, of a hollow, metal housing 24. The upper portion 20 is of a generally cylindrical shape and carries an annular top flange 26 and a deflecting plate 28 having an opening for receiving waste materials. The bottom portion 22 is generally cup-shaped and includes a central bottom opening 30 coaxial with the cylindrical top portion of the housing 24. The top and bottom portions of the housing are connected together by a plurality of bolts 32 and cooperate internally to define an annular recess 34 for tightly receiving and holding the cutter ring 16 coaxial with the central axis of the housing.

The preferred form of the cutter ring 16 is best illustrated in FIGURES 2, 3 and 5 and includes a series of spaced teeth 35 extending from and carried by an inner wall 36 of the ring. Each tooth extends at an angle, preferably 45°, and in a plane parallel to the central axis of the ring and housing with an inner arcuate face coaxial with said axis. Every sixth tooth of the ring includes a top portion which extends above the tops of the adjacent teeth in a generally horizontal plane to define a plurality of inverted, generally L-shaped teeth 35a in a series of teeth. Separated from each tooth 35a by a single tooth is an elongated tooth 35b which extends the height of the ring 16 and includes an enlarged inwardly inclined top portion above the tops of all the other teeth in the series.

As will be described in greater detail hereinafter, the L-shaped teeth 35a and the enlarged teeth 35b trap and direct waste materials between the other teeth of the ring and cooperate with the balance of the cutter assembly 14 to enable the disposer to rapidly and reliably reduce cloth, plastic, bones, fibrous substances and even small metal objects, such as pins, needles, hairpins, syringes and the like. In this regard, the illustrated form of the ring 16 has proven to be the optimum array of teeth for reducing the foregoing as well as other more conventional waste materials.

In addition to the cutter ring 16, the cutter assembly 14 includes a disc 38 of slightly smaller outer diameter than the inner diameter of the ring. The disc 38 is connected to the upper end of a vertical drive shaft 39 of a motor 40 to turn about the central axis of the housing within the ring 16. In this regard, the vertical drive shaft 39 of the motor 40 extends upwardly through the bottom opening 30 in the housing 24 along the central axis thereof and through a conventional bearing assembly 43. The motor 40 is connected to and extends downwardly from the bottom of the housing 24 and carries a plurality of adjustable feet 45 for resting upon various support members (not shown).

As illustrated most clearly in FIGURES 1, 3 and 4, the disc 38 carries a plurality of cutter blocks 42 and associated cutter blades 44 around and in contact with the lower portion of the ring 16. The cutter blocks 42 are seated within generally rectangular, radially extending recesses 46 in the outer marginal top portion of the disc 38 and are connected to the disc by vertical bolts 48. The blocks 42 are angled slightly such that only one vertical edge of the block engages the inner faces of the teeth 35 upon a turning of the disc. The cutter blades 44 also lie within the rectangular recesses 46 and are stationed under the cutter blocks 42 with outer edges extending in a horizontal plane under and in contact with the flat, horizontal bottoms of the teeth 35 of the ring 16.

With this arrangement of the cutter assembly 14, when waste material is deposited into the disposer 10 through the open top of the housing 24, it falls downward onto the top of the disc 38. Water is also introduced into the upper chamber 12 with the waste material. Operation of the motor 40 causes the disc 38 to rotate rapidly, in a counterclockwise direction in the illustrated form. A plurality of pairs of ears 50 extending upwardly from the top of the disc 38 act with the centrifugal force developed by the disc to throw the waste material radially outwardly against the inner wall 36 of the ring 16 upon a turning of the disc. Simultaneously, the waste material is carried by the disc 38 in a circular path against the teeth 35 of the cutter ring 16. As the waste material rotates with the disc 38, it is captured by the L-shaped teeth 35a and directed downwardly thereby, as well as by the enlarged teeth 35b, between the other teeth of the cutter ring. The captured waste material is then repeatedly sheared by the vertical edge of the cutter blocks 42 as they travel with the disc around and in contact with the inner faces of the teeth 35. The sheared material passes downwardly below the ring 16 between the teeth 35 thereof. There, the material is sheared a second time by the cutter blades 44 carried by the disc 38. This double shearing action reduces even the most dense waste material and allows the material to flow with water between the outer edge of the disc 38 and the bottom of the ring 16 into the outlet chamber 18. From the outlet chamber, the waste material flows with the water out a side port 52 and through a pipe 54 into a sewage line (not shown).

During the operation of the disposer 10, the reduced waste materials are prevented from working their way into the bearing assembly 43 of the disposer. This is accomplished by an annular flange 56 which extends downwardly from the bottom of the disc 38 and seats within an annular recess 58 in the bottom portion of the housing 24 around the bearing assembly.

When the waste material has been completely reduced and disposed of by the cutter assembly 14, the disposer 10 may be internally cleaned by continuing to run water therethrough, which drains between the outer edge of the disc 38 and the ring 16 and through drain ports 60 in the disc. The drain ports 60 prevent water from accumulating within the disposer after the disposer has been turned off.

In practice, the continual capturing, shearing, recapturing, and shearing between the cutter blocks and angled and L-shaped teeth of the cutter ring, as well as the shearing action between the bottoms of the teeth and the cutter blades, has been found to rapidly reduce the most dense and fibrous of waste materials with a minimum of foaming action occurring within the disposer. In this respect, the illustrated array of teeth, inclined at 45° angles, and including the spaced arrangement of L-shaped and enlarged teeth has proven to provide optimum waste reducing results.

From the foregoing description, it is appreciated that the present invention provides an improved cutter ring for a disposer cutter assembly, as well as an improved cutter assembly combination, which overcomes the limitations of commercially available disposers by enabling a disposer to rapidly and reliably reduce cloth, paper, plastic, fibrous substances, small metal objects and other dense waste materials.

While a particular form of cutter ring and cutter assembly has been described in some detail herein, minor modifications may be made in the illustrated form without departing from the spirit of the present invention. It is, therefore, intended that the present invention be limited in scope only by the terms of the following claims.

I claim:
1. In a disposer:
a metal body having a vertical hole therein defining an inner wall carrying a circular array of inwardly projecting spaced teeth, each extending at an angle and in a plane parallel to the vertical central axis of said array and forming a first shearing edge, particular ones of said teeth including top portions extending above the tops of others of said teeth and at a greater angle relative to said central axis to define inverted, generally L-shaped teeth in said array;
a disc supported for turning about said central axis within said array, said disc rigidly carrying a cutter element having a second shearing edge for consecutively engaging said first shearing edges and cooperating therewith to shear disposal material with a turning of said disc; and
drive means for turning said disc.

2. In a disposer:
a metal body having a vertical hole therein defining an inner wall carrying a circular array of inwardly projecting spaced teeth forming a first shearing edge, each extending at an angle and in a plane parallel to the central vertical axis of said array and including a generally flat, horizontal bottom defining a shearing edge, particular ones of said teeth including top portions extending above the tops of others of said teeth and at a greater angle relative to said central axis to define inverted, generally L-shaped teeth in said array;
a disc supported for turning about said central axis within said array and rigidly carrying a cutter element forming a shearing edge for consecutively engaging said first shearing edges and cooperating therewith to shear disposal material with a turning of said disc:
a flat blade extending from said disc along said horizontal bottoms of said teeth for cooperating with said shearing edge; and
drive means for turning said disc.

3. The combination of claim 2 wherein said disc carries a plurality of upwardly extending ears on its topmost surface.

4. The combination of claim 2 wherein the bottom portions of said particular ones and the others of said teeth extend at 45° angles relative to said central axis.

5. In a disposer:
a hollow housing having a bottom portion with a central opening;
a metal ring supported within said housing over said bottom portion coaxial with said central opening and carrying a series of spaced teeth on its inner wall, each tooth forming a first shearing edge and extending at an angle and in a plane parallel to the central axis of said ring, particular ones of said teeth including top portions extending above the tops of the others of said teeth and at a greater angle relative to said central axis to define inverted, generally L-shaped teeth in said series of teeth;

a disc for turning within said ring about said central axis and rigidly carrying a cutter element including a second shearing edge for consecutively engaging and cooperating with said first shearing edges with a turning of said disc;

a drive motor including a vertical shaft connected to said disc to support said disc within said ring;

bearing means around said shaft within said opening in said bottom portion of said housing; and an annular flange extending downwardly from the bottom of said disc and seating in an annular recess in said bottom portion of said housing around said bearings to prevent foreign matter from entering said bearing means.

References Cited

UNITED STATES PATENTS

| | | | |
|---|---|---|---|
| 2,322,058 | 6/1943 | Powers | 241—46.1 |
| 2,656,985 | 10/1953 | Backlund | 241—299 XR |
| 2,829,838 | 4/1958 | Macemon | 241—257 XR |
| 2,848,172 | 8/1958 | Ewing | 241—260 XR |
| 2,902,228 | 9/1959 | Higer | 241—257 |
| 2,940,677 | 6/1960 | Jordan | 241—257 |

ROBERT C. RIORDON, Primary Examiner

D. EVENSON, Assistant Examiner

U.S. Cl. X.R.

241—279, 299